United States Patent
McDunn et al.

[11] Patent Number: 5,879,503
[45] Date of Patent: Mar. 9, 1999

[54] SPLICING TOOL AND METHOD FOR JOINING A FIRST TUBE AND A SECOND TUBE

[75] Inventors: Kevin J. McDunn, Lake in the Hills; Linda Limper-Brenner, Glenview; Minoo D. Press, Schaumburg, all of Ill.

[73] Assignee: Motorola, Inc., Schaumburg, Ill.

[21] Appl. No.: 710,819

[22] Filed: Sep. 23, 1996

[51] Int. Cl.⁶ .................................................. B32B 31/00
[52] U.S. Cl. ................................. 156/304.2; 156/304.6; 156/359; 156/503; 156/498
[58] Field of Search .................. 156/64, 158, 304.2, 156/304.3, 304.6, 359, 378, 503, 579, 311, 498

[56] References Cited

U.S. PATENT DOCUMENTS

| | | | |
|---|---|---|---|
| 4,521,263 | 6/1985 | Benin et al. | 156/159 |
| 4,714,513 | 12/1987 | McAlister | 156/359 |
| 4,769,102 | 9/1988 | Neumuller et al. | 156/359 |
| 4,780,158 | 10/1988 | Thomas | 156/304.2 X |
| 5,141,592 | 8/1992 | Shaposka et al. | 156/304.2 X |
| 5,188,697 | 2/1993 | Lueghamer | 156/499 |

FOREIGN PATENT DOCUMENTS

| | | | |
|---|---|---|---|
| 1260234 | 9/1986 | U.S.S.R. | 156/359 |
| 80/02124 | 10/1980 | WIPO | 156/304.2 |

*Primary Examiner*—James Engel
*Attorney, Agent, or Firm*—Heather L. Creps

[57] ABSTRACT

According to an aspect of the present invention, the foregoing needs are addressed by a splicing tool for joining a first tube and a second tube, including a first member and a second member which are moveably coupled. The first member has a first handle section and a first mold section. The first mold section has a first groove. The second member has a second handle section and a second mold section. The second mold section has a second groove. The first groove sized to receive at least a portion of a first tube, at least a portion of a second tube and a bonding material. The bonding material attaches the first tube to the second tube when the first and second grooves are substantially aligned and heat is applied to the bonding material.

16 Claims, 4 Drawing Sheets

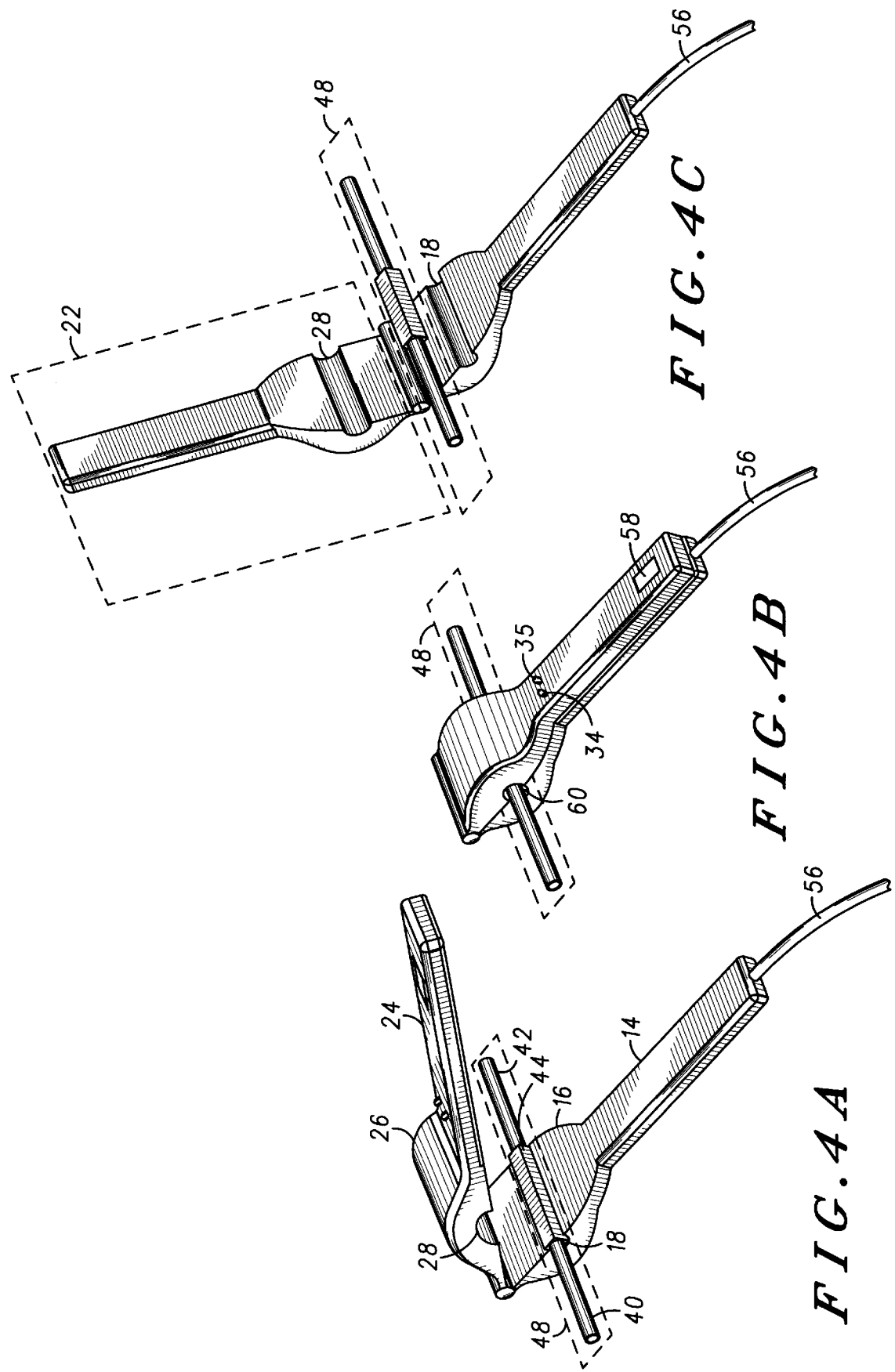

SPLICING TOOL AND METHOD FOR JOINING A FIRST TUBE AND A SECOND TUBE

FIELD OF THE INVENTION

The present invention relates generally to tools, and more particularly, to a splicing tool.

BACKGROUND OF THE INVENTION

Known line splicing tools and methods, including solvent or sealing type systems, soldering-type systems, quick disconnect systems and threading systems have notable drawbacks. For example, solvent or sealing type splicing systems may require the use of plastic or elastomeric tubing and require handling of liquid chemicals. In addition, solvent or sealing type splicing systems do not have built-in process controls to ensure a consistent seal.

The solder approach for splicing metal tubing may be limited to metals such as copper and also lacks built-in process controls.

Splicing via the use of quick disconnect fittings is costly and does not provide a leakproof connection and splicing via threaded fittings in conjunction with teflon tape or other joint compounds may be costly and not applicable to all types of tubing materials. Additionally, the aformentioned line splicing techniques when used in a field environment are cumbersome.

Thus, a need exists for a fluid line splicing tool which is compact, forms consistent seals, does not require the use of liquid chemicals and which includes a built-in process controller.

SUMMARY OF THE INVENTION

According to an aspect of the present invention, the foregoing needs are addressed by a splicing tool for joining a first tube and a second tube, including a first member and a second member which are moveably coupled. The first member has a first handle section and a first mold section. The first mold section has a first groove. The second member has a second handle section and a second mold section. The second mold section has a second groove. The first groove sized to receive at least a portion of a first tube, at least a portion of a second tube and a bonding material. The bonding material attaches the first tube to the second tube when the first and second grooves are substantially aligned and heat is applied to the bonding material.

According to another aspect of the present invention, a method for joining a first tube and a second tube, the method comprising the steps of providing a device comprising a first member and a second member, the first member having a first handle section and a first mold section, the first mold section having a first groove, the second member having a second handle section and a second mold section, the second mold section having a second groove, the second member moveably coupled to the first member; receiving at the first groove a portion of the first tube, a portion of the second tube, and a bonding material; substantially aligning the first groove with the second groove, the first groove and the second groove defining a chamber; applying heat to the chamber.

BRIEF DESCRIPTION OF THE DRAWINGS

FIG. 4A depicts a tubing assembly disposed in the splicing tool shown in FIG. 1.

FIG. 4B depicts the splicing tool shown in FIG. 1., coupled to form a chamber around the tubing assembly shown in FIG. 4A.

FIG. 4C depicts a removal of the tubing assembly from the splicing tool shown in FIG. 1, the tubing assembly joined according to a preferred embodiment of the present invention.

DETAILED DESCRIPTION OF THE PREFERRED EMBODIMENT

Figure 1:
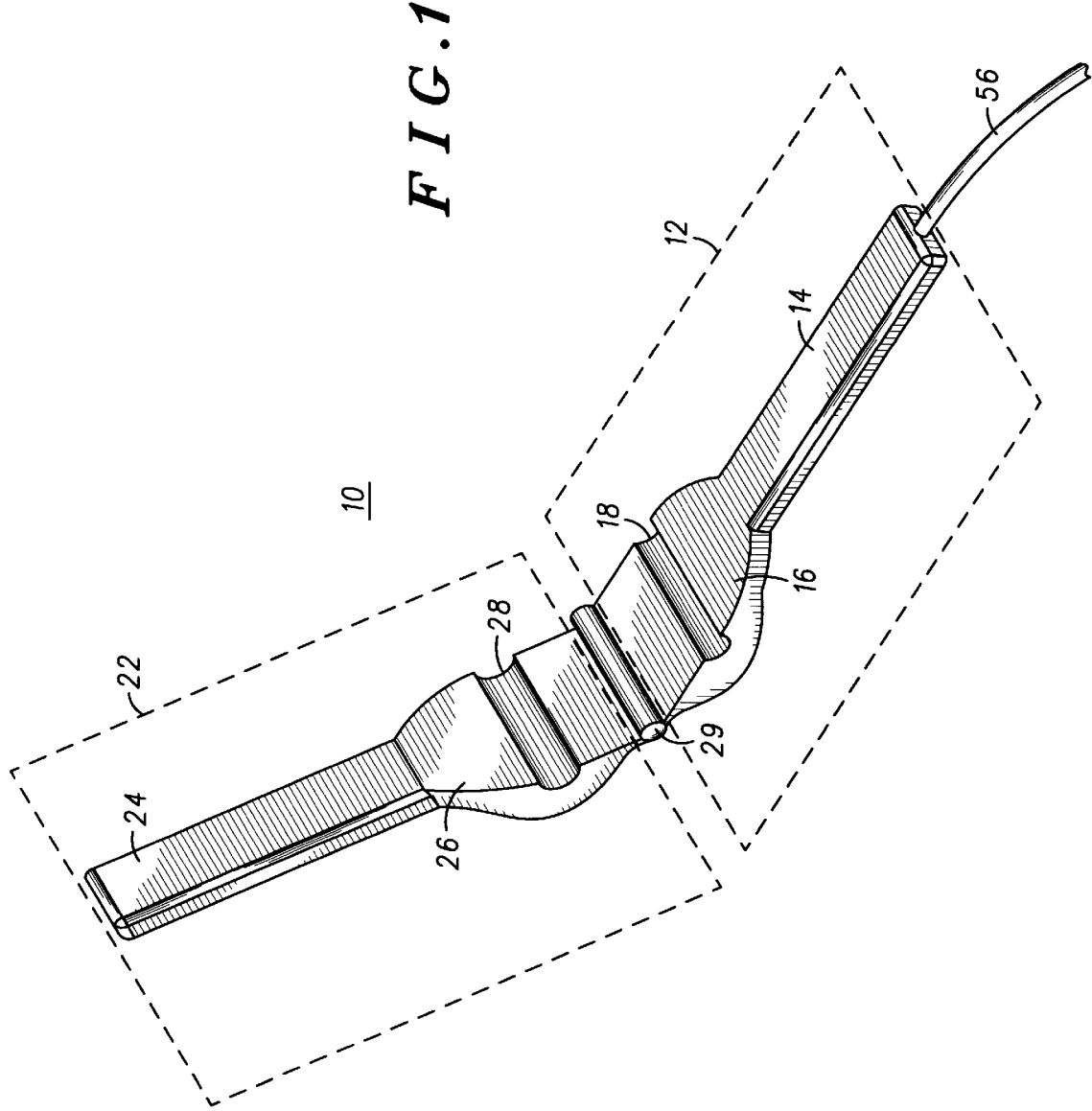
FIG. 1 depicts a splicing tool according to a preferred embodiment of the present invention.

Turning now to the drawings, wherein like numerals designate like components, FIG. 1 illustrates a line splicing tool 10 in accordance with a preferred embodiment of the-present invention. Line splicing tool 10 includes a first member 12 having a first handle end 14 and a first mold section 16 including a first groove 18; and a second member 22 having a second handle end 24 and a second mold section 26 including second groove 28.

As shown in FIG. 1, first member 12 is moveably coupled to second member 22 via a hinge 29. First member 12 and second member 22, however, may be coupled using any suitable means, for example, a living hinge, a snap, a clamp, or a latch. First member 12 and second member 22 are preferably metal but may be another material such as polyetherimide; and may be manufactured using well known methods such as die casting or machining.

First groove 18 and second groove 28 are formed in a thermally conductive portion of first mold section 16 and second mold section 26, respectively. Thermal conduction is supplied, for example, by materials such as aluminum, copper, or zinc.

Figure 2:
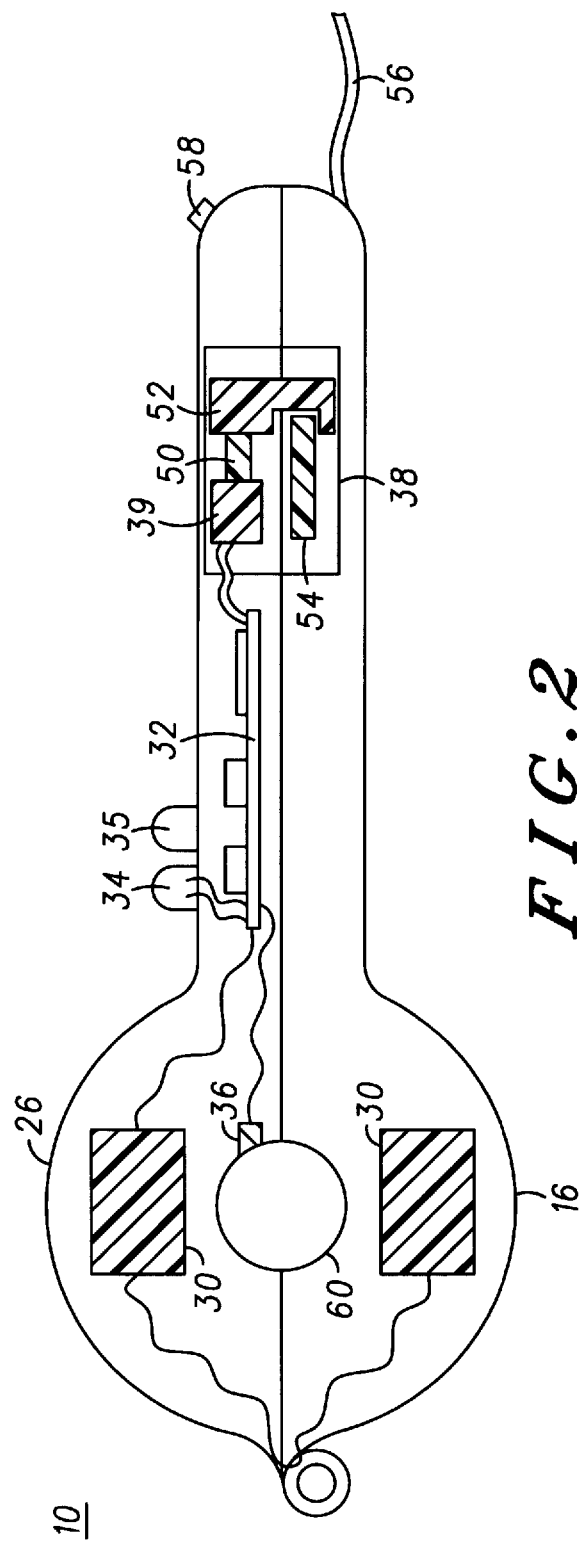
FIG. 2 is a side view of the splicing tool shown in FIG. 1.

FIG. 2 is a side view of splicing tool 10. A heating element 30 may be disposed in either first mold section 16 or second mold section 26, or both. Heating element 30 may be a resistive heating element, resistive heating elements being well known and widely available from a variety of sources, such as Heaters Engineering, Inc., located in North Webster, Ind. Alternatively, heating element 30 may be another type of heating element, such as a thermoelectric heat pump available from Melcor Thermoelectronics in Trenton, N.J.

Heating element 30 communicates with a controller 32, which may be implemented in a variety of ways, for example, using a digital signal processor (DSP). Controller 32, may further include a memory (not shown). Controller 32 also communicates with a first and second indicator 34 and 35, such as a visual indicator, which could be for example, be a light emitting diode, and a third indicator 36, such as a temperature sensor. Temperature sensors are well known and widely available from a variety of sources. Controller 32 may be responsive to a switch 58. Switch 58 may, for example, be a button, externally or internally mounted to first member 12 or second member 22.

Splicing tool 10 also includes a latching mechanism 38, in communication with controller 32, which preferably includes a solenoid 39, a plunger 50, and a latch 52, latch 52 being responsive to plunger 50 and sized to receive a catch 54. The elements of latching mechanism 38 are commonly known and widely available.

Power may be delivered to splicing tool 10 via cord 56. Cord 56 supplies 110 volts A.C. to various elements of splicing tool 10, such as solenoid 39, heating element 30, controller 32, first indicator 34, second indicator 35 and third indicator 36.

Figure 3:
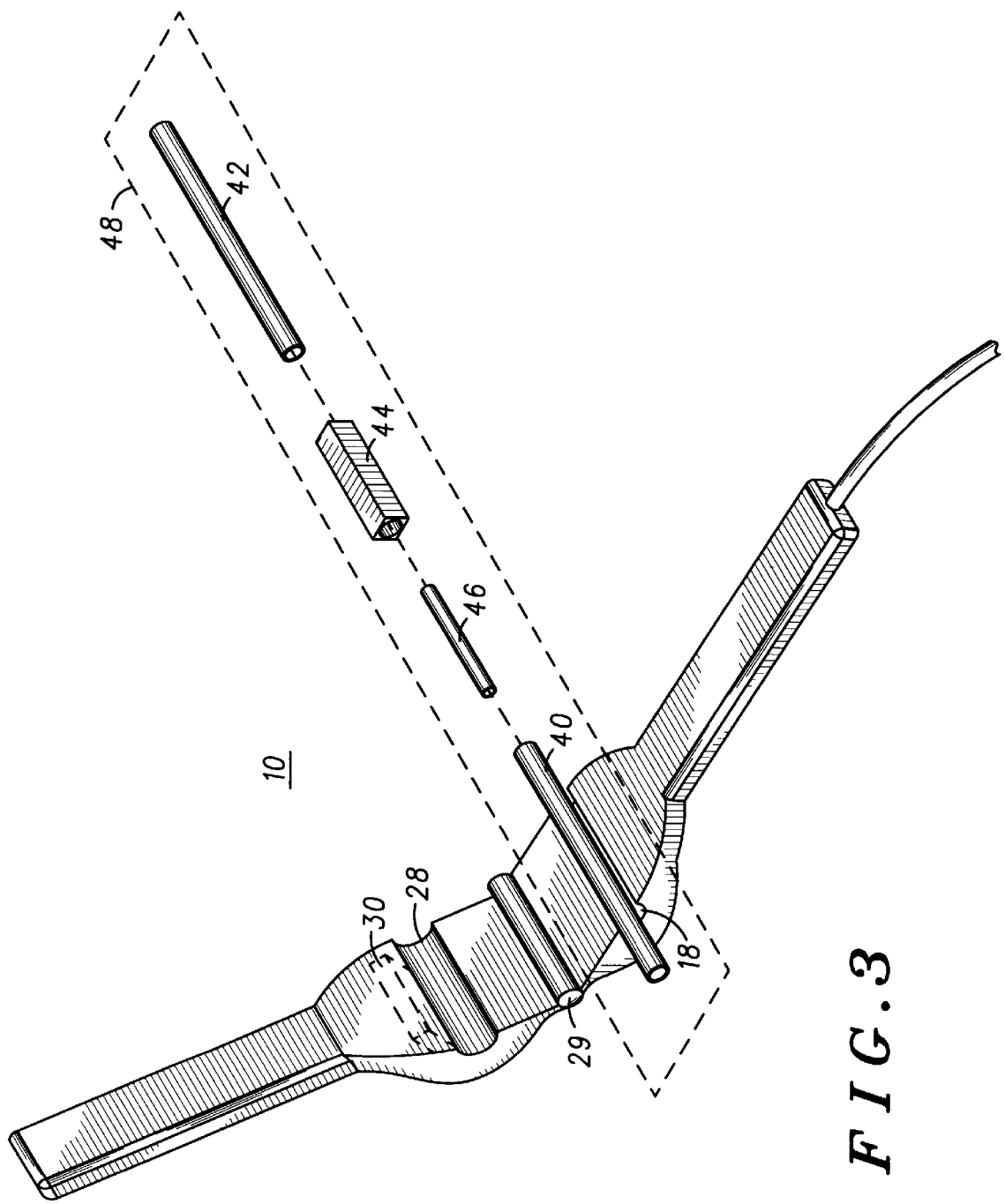
FIG. 3 depicts a tubing assembly for use in the splicing tool shown in FIG. 1.

As shown in FIG. 3, first groove 18 and second groove 28 are sized to receive a tubing assembly 48 which includes a first tube 40 and a second tube 42, and a bonding material 44. First tube 40 and second tube 42 may be standard tubing such as polyurethane, PVC, copper or stainless steel. A joint is formed by linking first tube 40 and second tube 42 by a rigid coupler 46 such that a cross-section of the end of first tube 40, and a cross-section of the end of second tube 42 are substantially adjacent. In a preferred embodiment, rigid coupler 46 may be a rigid, thin walled cylinder made of a high temperature plastic such as polyetherimide, or metal such as stainless steel, aluminum, or copper. Bonding material 44 is preferably, substantially centered over the joint created by first tube 40 and second tube 42. Bonding material 44 may be a low temperature thermoplastic material such as Valox, polyester, or polyolefin, in nugget form.

After tubing assembly 48 is disposed in groove 18 as shown in FIG. 4a, first member 12 and second member 22 are coupled such that first groove 18 and second groove 28 form a substantially continuous chamber 60 around tubing assembly 48, as shown in FIG. 4b.

Heat delivery to first groove 18 or second groove 28 or both, may be initiated by controller 32, which may, in turn, be responsive to switch 58. As shown, switch 58 is manually depressable.

Heat delivery to splice assembly is preferably accomplished using a thermoelectric pump, such pumps being available from Melcor Thermoelectronics in Trenton, N.J. Alternatively, a simple resistive heating element may be used to deliver heat to first groove 18 or second groove 28 or both.

If, for example, a thermoelectric heat pump is embedded in splicing tool 10, bonding material 44 may be precisely heated and cooled. The thermoelectric heat pump exploits the Peltier effect where temperature differences are generated across semiconductor thermocouples when current is applied. Thus, upon instruction by controller 32, heat is pumped from the outer layers of first member 12 and second member 22, to first groove 18 and second groove 28 for purposes of melting bonding material 44.

Upon activation, controller 32 may power-up visual indicator 34, visual indicator 34 being, for example, a red LED, indicating that heat delivery to first groove 18, second groove 28, or both, has begun and may stimulate latching mechanism 38 via supplying power to solenoid 39, which prevents premature tool opening. Latch 52, being designed to close around catch 54 which is rigidly fixed in first member 12, is activated through power delivery to solenoid 39 which in turn activates plunger 50, and deactivated by cessation of power to solenoid 39.

Temperature sensor 36, located according to well-known methods for optimal detection of the temperature within chamber 60, communicates with controller 32 for purposes of regulating the melt temperature within chamber 60. When the temperature in chamber 60 reaches a predetermined threshold, temperature sensor 36 notifies controller 32. Thus, a closed-loop thermal system is formed.

Upon completion of the heating cycle, temperature sensor 36, in concert with controller 32, monitors and controls the cooling cycle. For example, controller 32. may reverse current polarity across thermoelectric heat pump 30. The reversed polarity pumps heat from first groove 18 and second groove 28 to the outer layers of first member 12 and second member 22 for purposes of cooling the spliced joint. In addition, upon reaching an acceptably cool temperature, controller 32 may power up visual indicator 35, visual indicator 35 being a green LED, for example, indicating that removal of tubing assembly 48 is indicated. As shown in FIG. 4c, upon completion of the cooling cycle, tubing assembly 48 is removed from splicing tool 10 and the cycle is complete, first tube 40 having been joined to second tube 42.

While the invention has been particularly shown and described with reference to a number of embodiments, it will be understood by those skilled in the art that various changes in form and details may be made therein without departing from the spirit and scope of the invention.

What we claim is:

1. A splicing tool for joining a first tube and a second tube, comprising:
   a first member having a first handle section and a first mold section, the first mold section having a first groove;
   a second member having a second handle section and a second mold section, the second mold section having a second groove, the second member moveably coupled to the first member, the first groove sized to receive at least a portion of the first tube, at least a portion of the second tube, and a bonding material,
   the bonding material attaching the first tube to the second tube when the first and second grooves are substantially aligned and heat is applied to the bonding material;
   a thermoelectric heat pump disposed in the first mold section, the thermoelectric heat pump delivering heat to at least a portion of the first groove and then cooling the portion of the first groove; and
   a controller in communication with the thermoelectric heat pump, the controller regulating the cooling via changing a current polarity across the thermoelectric heat pump.

2. The splicing tool according to claim 1, wherein the bonding material comprises a thermoplastic nugget.

3. The splicing tool according to claim 1, wherein the first tube is disposed in the first groove.

4. The splicing tool according to claim 3, further comprising:
   a rigid coupler disposed in the first tube and the second tube.

5. The splicing tool according to claim 1, further comprising:
   an indicator responsive to the thermoelectric heat pump, the indicator providing notification of heat delivery to the first groove.

6. The splicing tool according to claim 5, wherein the indicator comprises a visual display.

7. The splicing tool according to claim 1, further comprising:
   a temperature sensor, the controller responsive to the temperature sensor, forming a closed-loop thermal controlled system.

8. The splicing tool according to claim 1. further comprising:
   a latching mechanism in communication with the controller, the latching mechanism comprising a latch responsive to a solenoid, the latching mechanism preventing premature opening of the splicing tool during heat delivery to at least a portion of the first groove and cooling of the portion of the first groove.

9. A method for joining a first tube and a second tube, the method comprising the steps of:
   providing a device comprising a first member and a second member, the first member having a first handle section and a first mold section, the first mold section having a first groove, the second member having a second handle section and a second mold section, the second mold section having a second groove, the second member moveably coupled to the first member;

receiving at the first groove a portion of the first tube, a portion of the second tube, and a bonding material;

substantially aligning the first groove with the second groove, the first groove and the second groove defining a chamber;

delivering heat to at least a portion of the first groove by a thermoelectric heat pump;

cooling the portion of the first groove by the thermoelectric heat pump; and regulating the cooling via changing a current polarity across the thermoelectric heat pump.

10. The method according to claim 9, further comprising the step of:

disposing a rigid coupler insert between the first tube and the second tube.

11. The method according to claim 9, further comprising the step of:

coupling the first tube and the second tube, the first tube and the second tube having substantially adjacent cross-sections, to create a joint.

12. The method according to claim 11, further comprising the step of:

disposing bonding material over the joint.

13. The method according to claim 12, wherein the bonding material comprises a thermoplastic nugget having a first end and a second end.

14. The method according to claim 13, wherein the step of positioning the bonding material comprises placing the first end of the thermoplastic nugget and the second end of the thermoplastic nugget substantially equidistant from the joint, to create a splice assembly.

15. The method according to claim 14, further comprising the step of:

disposing the splice assembly in the chamber.

16. The method according to claim 9, wherein the step of delivering heat to at least a portion of the first groove and then cooling the portion of the first groove comprises heating the chamber to a temperature of 100–200 degree C. and then cooling the chamber to a temperature of 25–35 degree C.

* * * * *